(12) United States Patent
Hall et al.

(10) Patent No.: US 6,657,219 B2
(45) Date of Patent: Dec. 2, 2003

(54) OPTICAL DETECTION AND MEASUREMENT SYSTEM

(75) Inventors: Richard Ronald Hall, Endwell, NY (US); How Tzu Lin, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 09/781,812

(22) Filed: Feb. 12, 2001

(65) Prior Publication Data

US 2002/0109111 A1 Aug. 15, 2002

(51) Int. Cl.[7] ............................................. G01N 21/86
(52) U.S. Cl. .............................. 250/559.29; 250/201.4; 356/3.01
(58) Field of Search ........................ 250/201.4, 559.29, 250/559.27, 201.3, 201.2, 201.5, 559.3; 356/3.01, 4.01, 4.05

(56) References Cited

U.S. PATENT DOCUMENTS

| 4,059,841 A | * | 11/1977 | Bricot et al. ............. 369/44.24 |
| 4,062,623 A | | 12/1977 | Suzuki et al. ................. 350/91 |
| 4,376,303 A | * | 3/1983 | Lurie ....................... 369/44.23 |
| 4,677,605 A | * | 6/1987 | Abed ....................... 369/44.23 |
| 5,317,142 A | | 5/1994 | Noda et al. .................. 250/201 |
| 5,483,079 A | * | 1/1996 | Yonezawa .............. 250/559.29 |
| 5,889,276 A | * | 3/1999 | Yonezawa et al. ........ 250/201.3 |
| 5,963,366 A | | 10/1999 | Nakamura et al. .......... 359/389 |

* cited by examiner

Primary Examiner—Edward J. Glick
Assistant Examiner—Hoon Song
(74) Attorney, Agent, or Firm—John A. Jordan; Arthur J. Samodovitz

(57) ABSTRACT

An optical detection and measurement system for selectively detecting the plane of the reflective surfaces of a workpiece. A laser source provides a low power, single wavelength collimated beam of light which is directed onto a workpiece. The beam is passed through a converging lens to a reflected focus on a quad detector. The light beams reflected from the workpiece pass through a diverging lens to the quad detector. The non-diverging optical axis center of the diverging lens is aligned with the center of the quad detector so that a reflected beam passing through the non-diverging optical axis center of the diverging lens creates equal photocurrent outputs from each of the four photosensitive elements of the quad detector to produce a null condition. Where the workpiece is made up of translucent or transparent layers which produce multiple reflected beams, reflected beams from surfaces other than the surface of interest are deflected away from the active surface of the quad detector by the diverging lens. The selectivity of beam detection of the system allows detection of the location individual reflective surface planes of the workpiece by positioning the workpiece so that each of the reflective surfaces individually pass their reflected beams through the non-diverging optical axis center of the diverging lens. Storing a numerical value indicative of the location of these planes permits calculation of layer and workpiece thickness.

16 Claims, 1 Drawing Sheet

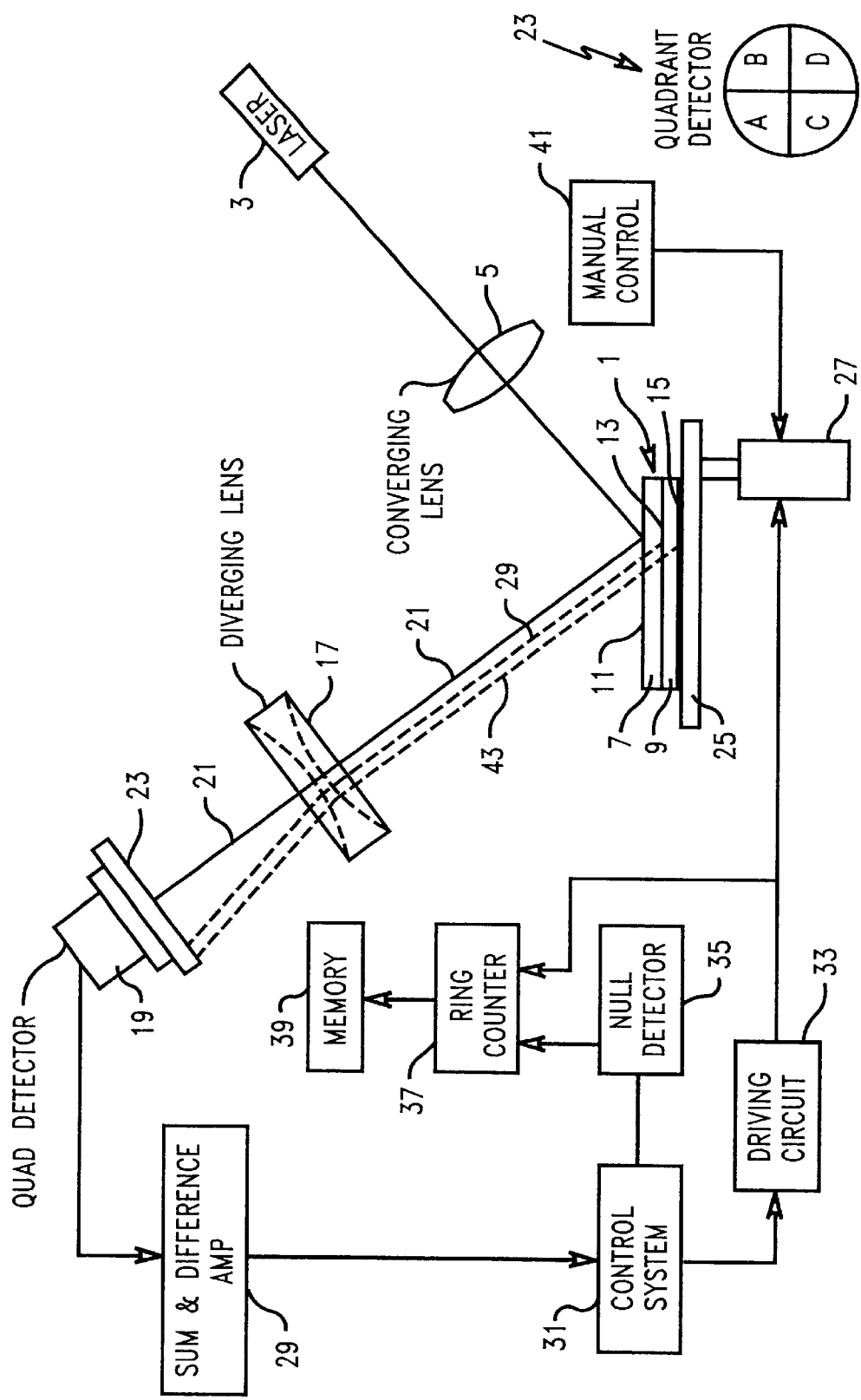
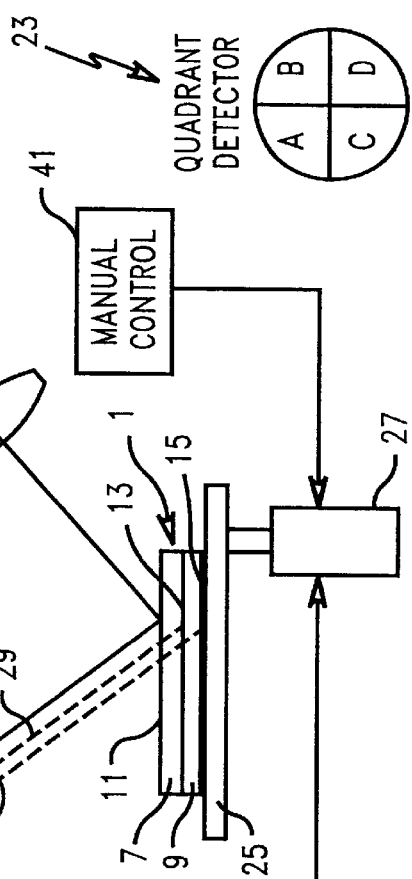
FIG. 1
FIG. 2

OPTICAL DETECTION AND MEASUREMENT SYSTEM

BACKGROUND OF THE INVENTION

1. Field of the Invention

The present invention relates to an optical detection and measurement system for locating a reflective surface plane and, more particularly, to an optical detection and measurement system which is capable of precisely locating individual reflective surface planes where multiple reflective surface planes may exist.

2. Background and Related Art

Various applications exist for locating a reflective surface plane. One application, for example, is in crystal growth. Other applications are in the deposition of materials whether opaque materials, such as certain metals, or translucent or transparent materials, as in the deposition of insulators or glassy material for passivation. Alternatively, applications exist for observing resist pattern films on a glass substrate, as in the process of manufacturing a liquid crystal substrate.

One of the difficulties in locating a reflective surface plane where transparent or translucent layers are involved resides in the fact that the multiple reflective surfaces produce multiple reflections which make it difficult to distinguish which reflection represents the surface of interest.

Various efforts have been made in the prior art to overcome the problem of distinguishing reflections from the top and bottom surface of glass, for example. Typical of the efforts for handling such reflections are those described in U.S. Pat. No. 5,317,142 to Noda, et al. and U.S. Pat. No. 5,483,079 to Yonezawa. However, the arrangements disclosed in these patents are complex and costly and are limited in their application.

SUMMARY OF THE INVENTION

In accordance with the present invention, a simple and precise optical detection and measurement system is provided which acts to deflect reflections from all surfaces except the surface of interest. The system allows detection of top surface position measurement of transparent materials, interlayer surface position measurement of transparent layers, determination of thickness of layers and end point detection in deposition, growth and like operations. Simplicity and accuracy is achieved in large part by using a divergent lens between the reflecting surfaces and a position sensing detector (PSD), such as, a quadrant detector.

Accordingly, it is an object of the present invention to provide an optical sensing system that can readily detect a single surface of an object.

It is another object of the present invention to provide an optical sensing and detection system that can monitor the surface change in material growth and depositions systems.

It is a further object of the present invention to provide an optical sensing system which is capable of precisely locating a given reflective surface plane.

It is yet another object of the present invention to provide an optical detection and measurement system which is capable of precisely locating individual reflective surface planes among multiple reflective surface planes.

It is still yet another object of the present invention to provide an optical detection and measurement system which is capable of precisely locating individual reflective surface planes in objects having more than one reflective surface plane to thereby measure the distance between planes.

It is a further object of the present invention to provide an optical detection and measurement system which is capable of precisely locating individual reflective surface planes in objects having multiple reflective surface planes so as to measure the distance between planes and thus the thickness of the layers between planes.

These foregoing and other objects, features and advantages of the invention will be apparent from the following more particular description of a preferred embodiment of the invention, as illustrated in the accompanying drawings, wherein like reference members represent like parts of the invention.

BRIEF DESCRIPTION OF THE DRAWING

FIG. 1 shows a schematic representation of the optical detection and measurement system in accordance with the present invention.

FIG. 2 shows a schematic representation of the four distinct photosensitive elements of the quadrant detector employed in the optical detection and measurement system shown in FIG. 1.

DETAILED DESCRIPTION

With reference to FIG. 1, there is shown an electro-optical system arrangement for detecting the location of the plane of individual reflecting surfaces of a workpiece. For ease of description, FIG. 1 shows a two layer workpiece 1, but it is clear that a single layer object or workpiece, or an object or workpiece with more than 2 layers, could as readily be used. For purposes of description at this point, we can assume layers 7 and 9 of workpiece 1 are either translucent or transparent.

Laser source 3 provides a low power, intense, single wavelength of light that is a collimated beam. The beam is passed through converging lens 5 which is a convex lens that converges the incident bundle of rays of light from laser 3 to a focus on quad detector 19. The convex lens helps keep the level of divergence of the beam to a minimum. Since layers 7 and 9 of workpiece 1 are either translucent or transparent, light incident workpiece 1 will be reflected from surfaces 11, 13 and 15, as shown.

The light reflected from the surfaces of workpiece 1 passes through diverging lens 17. Diverging lens 17 is a concave or dispersive lens which causes parallel light rays, with exception, to spread out as shown, thereby avoiding the photosensitive surface 23 of quadrant detector 19. However, the exception is the diverging lens does allow rays of light that are perpendicular to the front face at the center of the lens to pass through remaining on the optical axis. Thus, the beam of light 21, as shown, passes through lens 17 undeflected to the photosensitive surface 23 of quad detector 19.

FIG. 2 shows the four quadrants A,B,C & D of the photosensitive surface 23 of quad detector 19 in FIG. 1. Each of the quadrants are distinct photosensitive elements separated by minuscule gaps. Any of a variety of quad detectors may be used for this purpose. For example, the Segmented Position Sensing Detectors of UDT Instruments, Inc. could readily be employed as quad detector 19. When a light spot is translated across the surface 23 of such a detector in one direction the energy becomes distributed between adjacent elements. The ratio between the photocurrent outputs from these elements determines the relative position of the spot on the surface. Thus, when the four currents are equal or nulled, the light spot is centered. In the arrangement of FIG. 1, laser 3 may be positioned relative to detector 19 to null the currents in the X axis, i.e. A=B and C=D.

When work table 25 shown in FIG. 1 is moved upwardly by servo device 27, for example, beam 29 begins to translate across diverging lens 17 in the Y-direction and when it enters the center of the lens it passes through the lens relatively undeflected to the center portion of quad detector 19. At the point where there is a null condition between elements such that A=C and B =D, sum and difference amplifier 29 sends a null signal to control system 31 which terminates digital drive signals from driving circuit 33 to servo drive 27. At the same time, null detector 35 detects the null condition to cause the reading in ring counter 37 to be read into memory 39.

The reflected beam translation from the position point corresponding to the detection of the plane of surface 11 in the direction toward the detection of the plane of interface surface 13 of workpiece 1 may be initiated through manual control 41. By initiating the translation to cause table 25 to rise, reflected light beam 21 is moved off the center of diverging lens 17 and away from the null condition of detector 19. Sum and difference amplifier senses the imbalance and sends a difference signal to control system 31 which, in turn, causes driving circuit 33 to send pulses to servo drive 27 to continue moving table 25 upwardly. When the translated reflected light beam 29 reaches the precise center of the diverging lens and, thus, the null point of quad detector 19 similar to that described above, the null condition causes control system 31 to terminate pulses to servo drive 27. Null detector 35 causes another reading from ring counter 37 to be read into memory 39.

Thus, the plane of a second reflective surface of workpiece 1 is uniquely detected independent of the other reflected light signals or beams from the reflective surfaces of workpiece 1. With a count stored in memory 39 indicative of the plane of reflective surface 11 and another count indicative of the plane of reflective surface 13, the difference in these counts provides a measure of the thickness of layer 7 of workpiece 1.

Similarly, initiation of translation of reflected light beam 43 further in the Y direction toward the center of lens 17 is achieved through manual control 41 causing servo drive 27 to move table 25 upwardly. However, it should be understood that this could also be accomplished automatically through computer control, stepping from one reflective surface to another, until all reflective surface planes have been detected and a corresponding count stored in memory 37. Similar to the operation described above with respect to reflected light beam 21, when table 25 moves upwardly causing reflected light beam 29 is moved off the center of diverging lens 17, the null condition of this light beam is lost causing control system 31 and driving circuit 33 to send pulses to servo drive 27 moving reflected light beam 43 toward a null condition at the precise center of lens 17 and quad detector 19. As previously described, a third reading is then stored in memory 39 indicative of the plane of reflective surface 15 of workpiece 1.

By storing binary counts indicative of the various reflective surfaces, a measurement may be obtained of the thicknesses of the various layers of workpiece, the overall thickness of the workpiece, the top surface position of the workpiece, and the like. Similarly, in end point detection for deposition processes or crystal growth processes, for example, the position of the surface of the deposition layer or growth layer may continually be monitored until the desired thickness is reached. As is understood by those skilled in the art, this may all readily be accomplished by computer control.

It should be understood that although operation has been described wherein detection of the plane of reflective surfaces of a workpiece begins at its top surface, detection of the plane of reflective surfaces could begin at the bottom surface on the workpiece on the table top or any intermediate surface where the layers are at translucent or transparent. Where the detection process begins at the bottom layer, workpiece table 25 motion would increment downwardly for successive measurements toward the top surface of the workpiece. Similarly, although laser 3 has been described as being positioned to achieve a null condition, i.e., an electrical signal ratio balance between quadrants where A=C and B=D (FIG. 2) in quad detector 19, it is clear that laser 3 could also be positioned in the X direction by a servo drive, similar to the arrangement shown for the Y direction positioning of table 25, to thereby automatically position the laser beam at a null condition in the X-direction.

It is also clear that rather than move the workpiece 1 through a servo-driven work table, the laser, lenses and quad detector could be positioned on a machine axis and move as a system with the workpiece remaining stationary. Also, a charge couple device (CCD) camera could be used for the quad detector.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. An optical detection and measurement system for detecting the position of the plane of a reflective surface of a workpiece, comprising;

a work table for holding said workpiece;

a light source positioned to direct a collimated beam of light onto the said reflective surface of said workpiece to produce at least one reflected beam of light;

a quadrant detector having four distinct photosensitive elements in quadrant relationship each producing a photocurrent output positioned to receive said reflected beam of light;

a diverging lens having a non-diverging optical axis center positioned to align the said non-diverging optical axis center with the center of said quadrant detector so that when a reflective beam of light passes therethrough, each of said four distinct photosensitive elements produces the same photocurrent output; and a control system for moving said work table to translate said at least one reflected beam of light to the said non-diverging optical axis center of said diverging lens to cause said quadrant detector to create a null condition where each of the said four photosensitive elements produce the same value of photocurrent output to thereby detect the position of the plane of said reflective surface of said workpiece.

2. The optical detection and measurement system of claim 1 wherein said control system includes a work table positioning system and a sum and difference amplifier arranged to detect an imbalance in the photocurrent outputs of said four photosensitive elements to thereby cause said work table to move to a position which causes another reflected beam of light from another reflective surface to create a null condition where each of the said four photosensitive elements produce the same value of photocurrent output to thereby detect the position of the plane of said another reflective surface.

3. The optical detection and measurement system of claim 2 wherein said control system further includes measurement control and memory circuitry for storing numerical values indicative of the detected position of the reflective surfaces of said workpiece.

4. The optical detection and measurement system of claim 3 wherein the difference between successive stored numerical values provides a measure of the thickness of material deposition on said workpiece.

5. The optical detection and measurement system of claim 4 wherein a converging lens is positioned between said light source and said workpiece to further converged said collimated beam.

6. An optical detection and measurement system for detecting the respective planes of reflective surfaces of a workpiece, comprising;

a work table for holding said workpiece;

a light source positioned to direct a collimated beam of light onto the said reflective surfaces of said workpiece to produce reflected beams of light;

a quadrant detector having four distinct photosensitive elements each producing a photocurrent output positioned to receive said reflected beams of light;

a diverging lens positioned to align the non-diverging optical axis center of said lens with the center of said quadrant detector so that when one of said beams of light passes therethrough each of said four photosensitive elements produces the same photocurrent output; and a control system for moving said work table to translate one of said reflected beams of light toward the said non-diverging optical axis center of said diverging lens so that the said one of said reflected beams of light passes undeflected through the center of said lens to cause a null condition in said quadrant detector where each of the said photosensitive elements produces the same value photocurrent output to thereby detect the plane of the reflective surface of said one of said reflected beams of light.

7. The optical detection and measurement system of claim 6 wherein said control system includes a work table positioning system and a detector circuit to detect an imbalance in the photocurrent outputs of said four photosensitive elements to thereby cause said work table to move to a position which causes the said one of said reflected beams to create a null condition to balance said photocurrent outputs to the same value.

8. The optical detection and measurement system of claim 7 wherein said control system further includes a control device for initiating movement of said work table so that a reflected beam of light from the plane of another of said reflective surfaces passes undeflected through the center of said diverging lens to cause said null condition in said quadrant detector to thereby detect the plane of said another of said reflective surfaces.

9. The optical detection and measurement system of claim 8 wherein said control system further includes measurement control and memory circuitry for storing numerical values indicative of the detected surface planes of the respective reflective surfaces of said workpiece.

10. The optical detection and measurement system of claim 9 wherein the differences between said stored numerical values provides a measure of the thickness of the layers of said workpiece.

11. The optical detection and measurement system of claim 10 wherein a converging lens is positioned between said light source and said workpiece to further converge said collimated beam.

12. The output detection and measurement system of claim 11 wherein said light source is a laser light source.

13. The optical detection and measurement system of claim 6 wherein said workpiece is subject to material deposition and the reflective surface of said deposition layer produces a reflected beam which is continuously monitored until the desired thickness of the deposition layer is obtained.

14. A method of detecting and measuring the position of the plane of a reflective surface of a workpiece comprising the steps of;

directing a collimated beam of light onto the said reflective surface to produce a reflected beam of light;

positioning a diverging lens having a non-diverging optical axis center in the path of said reflective beam of light;

positioning a quadrant detector having four distinct photosensitive elements in quadrant relationship and each producing a photocurrent output so that the center of said quadrant detector is aligned with the said non-diverging optical axis center of said diverging lens;

moving said workpiece so that said reflective beam of light passes through the non-diverging optical axis center of said diverging lens to the center of said quadrant detector so that the said photosensitive elements each produce the same photocurrent output and a null condition; and sensing said null condition to thereby detect the position of the plane of said reflective surface of said workpiece.

15. The method of claim 14 wherein said workpiece comprises more than one layer of material which produces more than one reflected beam of light and said method includes the steps of;

further moving said workpiece so that the reflective beams of the said more than one reflective beams of light individually pass through the non-diverging optical axis center of said diverging lens to the center of said quadrant detector to produce respective said null conditions; and further sensing the respective said null conditions to thereby detect the positions of the planes of reflective surfaces of the said more than one reflective beams of light.

16. The method of claim 15 comprising the further steps of;

measuring the position of each of the said respective null conditions and storing said measurements;

and calculating the thicknesses of said layers of material using said stored measurements.

* * * * *